No. 654,447. Patented July 24, 1900.
H. G. EMERSON.
POOL BALL RACK.
(Application filed May 1, 1899. Renewed June 4, 1900.)

(No Model.) 2 Sheets—Sheet 1.

No. 654,447. Patented July 24, 1900.
H. G. EMERSON.
POOL BALL RACK.
(Application filed May 1, 1899. Renewed June 4, 1900.)
(No Model.) 2 Sheets—Sheet 2.
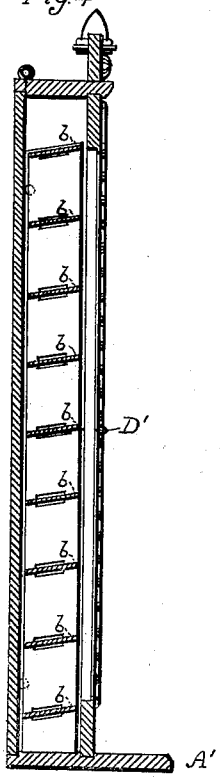
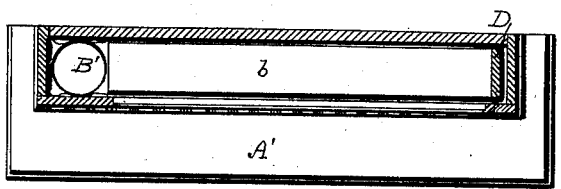
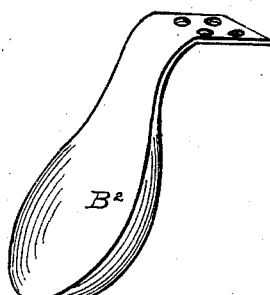
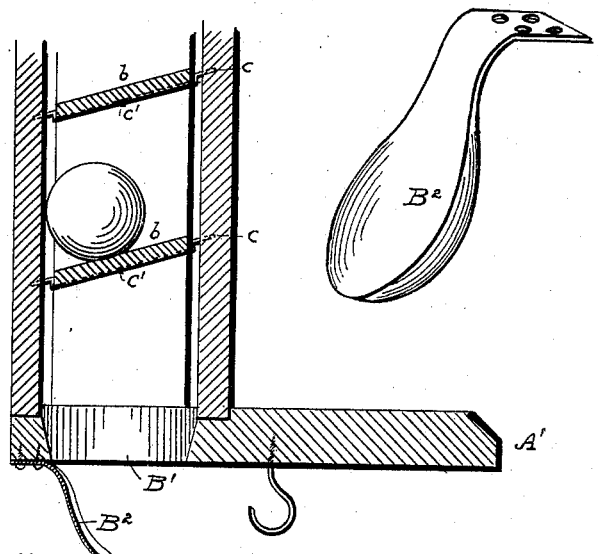
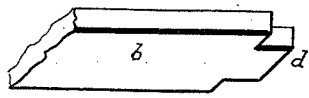
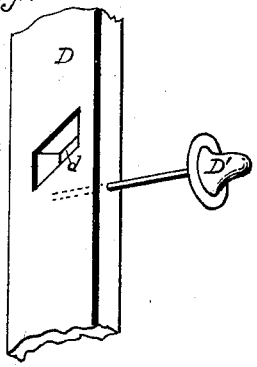
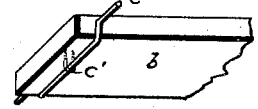
WITNESSES:
Jno B. Tilford
John Duncan
Herbert G. Emerson INVENTOR
BY
R. M. Kelly
ATTORNEY.
THE NORRIS PETERS CO., PHOTO-LITHO., WASHINGTON, D. C.

United States Patent Office.

HERBERT G. EMERSON, OF LOUISVILLE, KENTUCKY, ASSIGNOR TO SAMUEL F. HARLAN, OF SAME PLACE.

POOL-BALL RACK.

SPECIFICATION forming part of Letters Patent No. 654,447, dated July 24, 1900.

Application filed May 1, 1899. Renewed June 4, 1900. Serial No. 19,046. (No model.)

*To all whom it may concern:*

Be it knwn that I, HERBERT G. EMERSON, a citizen of the United States, residing at Louisville, in the county of Jefferson and State of Kentucky, have invented a new and useful Rack for Pool-Balls, of which the following is a specification, reference being had therein to the accompanying drawings, in which—

Figure 1 represents a front view of the rack, the shelves horizontal in position to retain the balls; Fig. 2, a similar view showing the shelves tilted and portions of the architrave-jambs on each side broken away to show the channel for the descent of the balls and the construction of the shelf-operating means; Fig. 3, a horizontal cross-section taken at the line Y Y of Fig. 1; Fig. 4, a vertical cross-section, taken on the line X X of Fig. 1; Fig. 5, a vertical cross-section, enlarged, taken on the line 3 3 in Fig. 2. Fig. 6 is a detail, enlarged, of the spoon-shaped guide adapted to throw the balls descending from the shelves through the channel forward toward the central part of the ball-receptacle. Fig. 7 is a perspective view, enlarged, of a portion of the tilting bar, showing the tilting handle and one of the mortises adapted to support the tilting end of the shelf. Fig. 8 is a similar view of the tilting end of a shelf, showing the tenon; and Fig. 9 is a similar view of the pivoted end of a shelf, showing the pivot-bracket.

The case for the shelves is made in the usual manner, open at the front and adapted to be fastened to the wall of the room or to an upright frame or horse.

Similar letters of reference refer to corresponding parts in all the figures.

My invention relates to that class of devices which are used for retaining pool or billiard balls in position when not in use or when placed in such rack by the players; and it has for its object to so construct a device of that class that in a simple and convenient way all the balls may at the conclusion of the game be gathered in a receptacle at the bottom of the rack.

In the drawings, A designates the body of my improved pool-ball rack, which is provided with a series of parallel shelves $b$, arranged so that their edges next to the back of the case shall be lower than their front edges, as indicated in Figs. 4 and 5, so that balls placed on them will not roll off forward, and is provided with suitable guiding and collecting means. Between the ends of these shelves and the outer wall of the body A on the left side in Figs. 1 and 2 of the drawings is a well or channel B, lined with baize to deaden noise, which serves as the preferred guiding means for the balls, through which and through a corresponding aperture $B'$ in the sill $A'$ of the rack-frame the balls rolling from the shelves drop into a collecting means, which preferably is a basket or other receptacle $B^3$, pivotally suspended below the aperture, into which they are directed by the spoon-shaped guide $B^2$, attached to the bottom of the sill $a'$ and adapted to throw the balls into the receptacle about its center to prevent it from tilting. The basket is preferably freely suspended from a hook $B^4$, which depends from the bottom of the sill $A'$, so that it may be readily removed from said hook when all the balls have been discharged into it and used to carry said balls to the table between games.

The ends of the shelves $b$ next to the well or channel B are pivoted on brackets $c$, preferably made of wire, the ends of which are supported by the front and rear parts of the frame-joints and which are attached to the shelves by staples $c'$, and the other ends of the shelves are provided with tenons $d'$, adapted to seat in mortises $d$ in a vertical lifting-bar D, arranged within the right-hand side of the frame, as shown in the drawings, and adapted to be raised or lowered by the handle $D'$, adapted to work in the slot $D^2$, formed in the frame-strip which closes the front of the space within which said bar works. The mortises $d$ are a little larger than the tenons $d'$, thereby allowing play to the ends of the shelves when tilted up. By raising the handle $D'$ the bar D, in which the tenoned ends of the shelves are seated, is lifted, and the shelves are tilted and the balls roll off the pivoted ends of the shelves into the well or channel B and through the circular opening $B'$ in the sill $A'$ of the frame into the receptacle $B^3$, from which they can be carried to the table.

Having thus described my invention, what I claim, and desire to secure by Letters Patent, is—

1. A pool-ball rack, comprising a frame or case provided with guiding and collecting means for the balls, a series of shelves discharging into said guiding means when tilted, each of said shelves having a tenon at one end, a pivotally-mounted wire bracket supporting the other end of each shelf and arranged diagonally, and a vertically-movable lifting-bar for the shelves, having a series of diagonal mortises to receive said tenons, said mortises being of a size to permit the tenons to have play therein, substantially as described and for the purposes specified.

2. In a pool-ball rack, a frame constructed to provide a well or channel extending from its top to its bottom and having a discharge-opening from the bottom of said well or channel, and a series of shelves communicating with said well or channel and discharging into the same, in combination with a receptacle pivotally mounted beneath said discharge-opening, and a guide arranged between the discharge-opening and receptacle and operating to direct the balls to about the center of the receptacle, so as to prevent tilting of the latter, substantially as described.

3. In a pool-ball rack, a frame constructed to provide a well or channel extending from its top to its bottom and having a discharge-opening from the bottom of said well or channel, a receptacle placed below said discharge-opening, a guide attached to the bottom of the frame and operating to direct the balls to about the center of the receptacle, a mortised vertically-movable bar at one end of said frame, and a series of shelves communicating with said well, each of said shelves being pivoted at its end next the well and having its other end provided with a tenon received by and having play in a mortise in said vertically-movable bar, substantially as described.

4. In a pool-ball rack, a frame constructed to provide a well or channel extending from its top to its bottom and having a discharge-opening from the bottom of said well or channel, a series of shelves communicating with said well or channel and discharging into the same, and means for tilting said shelves toward the well or channel, in combination with a hook secured to the bottom of said frame near the discharge-opening, a basket pivotally and removably suspended from said hook, and a guide to direct the balls from the discharge-opening to about the center of the basket.

Subscribed by me in the presence of two witnesses.

HERBERT G. EMERSON.

Witnesses:
JNO. B. TILFORD,
WM. ALVOT.